Dec. 14, 1943. P. H. LIGHT 2,336,872
PROTECTION OF ALTERNATING CURRENT ELECTRIC POWER SYSTEMS
Filed April 24, 1942
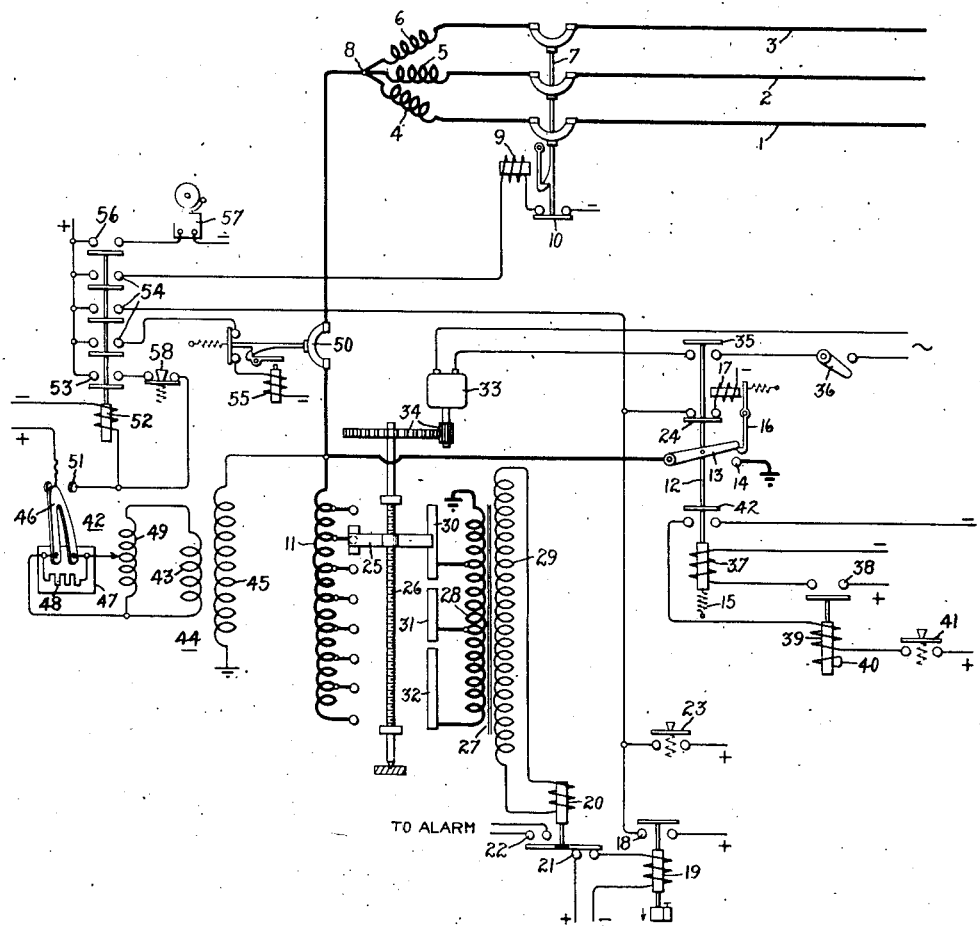
Inventor:
Philip H. Light,
by Harry E. Dunham
His Attorney.

Patented Dec. 14, 1943

2,336,872

UNITED STATES PATENT OFFICE 2,336,872

PROTECTION OF ALTERNATING CURRENT ELECTRIC POWER SYSTEMS

Philip H. Light, Schenectady, N. Y., assignor to General Electric Company, a corporation of New York Application April 24, 1942, Serial No. 440,278

8 Claims. (Cl. 175—294)

My invention relates to improvements in the protection of alternating current electric power systems, and especially systems of the type wherein a fault to ground on a phase conductor of the system substantially increases the capacitance current to ground of the ungrounded phase conductors and wherein ground faults of a transient character are to be cleared by a zero-sequence inductive connection to ground proportioned to provide on the occurrence of a ground fault on a phase conductor of the system a lagging current for effectively suppressing the capacitance current at the grounded point.

In alternating current power systems which operate without a neutral grounded more or less directly, single conductor-to-ground faults of a transitory or arcing character may be suppressed by a ground fault neutralizing device, as disclosed in United States Letters Patent 1,537,371, issued May 12, 1925, without interruption of service. Since a large percentage of the faults on alternating current electric systems involve initially, at least, only a single conductor-to-ground, such neutralizing device materially improves the service continuity factor. The neutralizing device is usually connected between a neutral of the system and ground and proportioned to have together with the means providing the neutral, a zero-sequence inductance such as to provide on the occurrence of a ground on a phase conductor of the system a lagging current for effectively suppressing the capacitance current to ground of the ungrounded phase conductors. Usually the neutral is provided by inductive apparatus such as a zig-zag or Y-delta grounding transformer or a Y-delta power transformer. Ordinarily the amount of the inductance provided by such transforming means in the neutralizer connection is a relatively small proportion of the total inductance of this connection.

Inasmuch as the capacitance to ground of the system phase conductors changes materially with the amount of the system in service, it is necessary to vary the inductance of the neutralizing device from time to time so that it will always be in condition to provide on the occurrence of a ground on a phase conductor of the system a lagging current for effectively suppressing the capacitance current to ground at the grounded point regardless of the amount of the system in service. For this variation in inductance, the neutralizer is usually provided with a tap changing switch. Since the voltage across the neutralizing device is normally fixed, that is, line-to-neutral voltage, the current in the neutralizing device depends upon the number of turns in service. Usually the neutralizing device is designed to have the same time rating for each current tap. For this purpose, the turns nearer the neutral end may have the larger wire or more cooling facilities, such as oil vents and so forth, or both features may be employed since it is not economically feasible to construct each turn with the same current-time rating.

Now since it is possible to have system conditions such that the neutralizer is subject to more than normal line-to-neutral voltage, the neutralizer may become overheated. Such overvoltage may occur if the neutralizing device is left connected to the system with one phase of the system open to give rise to series resonance. Under such conditions, the actual current rating of the neutralizing device may be exceeded. If this happens, it is highly important to know about it before the time rating of the neutralizing device has been exceeded. Also, in some systems whose phase conductors are electrostatically unbalanced, there may be a relatively high residual current. Usually the neutralizing device is continuously rated for such unbalanced current. However, the neutralizer is, in effect, preheated by this residual current.

It will be apparent that the use of a current transformer under such variable conditions for energizing the thermally responsive device would require a more or less elaborate tap changing arrangement which would have to be coordinated with the tap changing arrangement of the ground fault neutralizing device throughout the full range thereof. Any attempt to use a saturating current transformer leads into difficulties since the residual current may well be equal to the saturating current value of the transformer and give an indication that the neutralizing device is overheated when it really is not. On the other hand, such saturating transformer because of its relatively low current saturating value would not give any indication of the relatively high current flowing in consequence of an overvoltage on the neutralizer. Any attempt to determine the heat condition of the neutralizing device by the use of a current transformer measuring some fixed current value is consequently unsafe as a criterion of the heating of the neutralizing device, and any tap changing arrangement of the current transformer involves difficulties in coordination with other apparatus as well as more or less prohibitive expense.

One object of my invention is to provide, in a protective arrangement for an alternating current electric system embodying a ground fault neutralizer whose inductance has to be varied to correspond with the amount of the system in service, a relatively simple and economical means for protecting the neutralizer against excessive heating without any need for tap changing switches or like devices whose operation would have to be coordinated with the inductance changing means of the neutralizer. Another object of my invention is to provide for the neutralizer a thermal protective means which, in the event of the neutralizer running cool because of lower than normal voltage across it, makes it possible to utilize this under-temperature condition in the event of a subsequent tendency to overheating. These and other objects of my invention will appear in more detail hereinafter.

In accordance with my invention, I provide, for a ground fault neutralizer, protective means whose response is based on an electrical quantity which determines the safe heating of the neutralizer regardless of the number of turns in service. Also, in accordance with my invention, I avoid the necessity for any tap changing switches and devices of similar character. Further in accordance with my invention, I use an electrical quantity such as the voltage across the portion of the neutralizer in service since this quantity is normally substantially constant and provides a true measure of the safe heating of the neutralizer particularly in the event of any change in the voltage to ground of the neutral point to which the neutralizer is connected.

My invention will be better understood from the following description when considered in connection with the accompanying drawing, and its scope will be pointed out in the appended claims.

The single figure of the accompanying drawing diagrammatically illustrates an embodiment of my invention in a ground fault neutralizer protective arrangement for a three-phase alternating current electric system of the type in which a fault to ground on a phase conductor of the system substantially increases the capacitance current to ground of the ungrounded conductors. As shown, the system comprises three phase conductors 1, 2, and 3, which are connected to the Y-connected windings 4, 5, and 6 of a power transformer through suitable circuit interrupting means, such as a latched closed circuit breaker 7. The windings 4, 5, and 6 provide a system neutral 8, and the power transformer is assumed to have a set of delta-connected windings, not shown. Obviously the neutral may be provided by any other suitable inductive apparatus, such as a zig-zag or a Y-delta grounding transformer. The circuit breaker 7 is provided with a trip coil 9 and an "a" auxiliary switch 10 in circuit therewith.

In order to clear transitory or arcing ground faults without interruption of service such as would follow by opening, for example, the circuit breaker 7 every time there was a ground fault on one phase conductor, suitable suppressing means, such as a ground fault neutralizer 11, is provided. The inductive reactance or ground fault neutralizer 11 is proportioned to have together with the windings of the transformer which provides the neutral 8 a zero-sequence inductance such as to provide on the occurrence of a ground on a phase conductor of the system a lagging current for effectively suppressing the capacitance current to ground of the ungrounded phase conductors. Ordinarily the amount of the inductance provided by the transformer in the neutralizer connection is a relatively small proportion of the total inductance of this connection in order that, for ground faults which the neutralizer cannot suppress, sufficient ground fault current may flow after the neutralizer is short-circuited to permit the operation of the system ground fault relays not shown.

In order that the system ground fault relays may take care of non-transitory ground faults on the system, it is customary to provide means for establishing a low impedance path to ground from the neutral in response to a predetermined current flow for a predetermined time in the neutralizer connection through the neutral 8. For this purpose, there is usually provided suitable means, such as a grounding switch 12, which is arranged to be closed to render the ground fault neutralizer ineffective after the flow therein of lagging current above a predetermined value for a predetermined time. For this purpose, the switch 12 is arranged through its relatively movable contacts 13 and 14 to complete a circuit to ground from the neutral 8 in parallel with the ground fault neutralizer 11. As illustrated, the switch 12 is of the latched open electric trip-to-close type under suitable bias, as by spring means 15 or gravity, or both. The tripping of the latch 16 which holds the movable contact 13 of the switch 12 in the open position is effected by a trip coil 17 whose circuit includes the normally open contacts 18 of a time delay closing relay 19. The energization of this relay is controlled in response to the current flowing in the ground fault neutralizer 11 by suitable means, such as a relay 20, which controls normally closed circuit opening contacts 21 in the circuit of the winding of the relay 19 and the normally open contacts 22 of the circuit of an alarm or suitable indicating device. For otherwise closing the switch 12, the circuit of the trip coil 17 is shown with a switch 23 which may be manually or otherwise operated. The circuit of the trip coil 17 may also include an auxiliary "b" switch 24, movable with the switch contact 13.

Inasmuch as the extent of the power system in service may vary from time to time, the capacitance current to ground of the system and, therefore, the capacitance current to ground of the ungrounded phase conductors of the system, in case of a fault on one phase conductor, will vary. This necessitates a change in the inductance of the ground fault neutralizer 11 so as to produce the required amount of lagging current. Thus, with a large amount of the system in service, there will be a large capacitance current, and this will require a high lagging current or relatively few turns of the neutralizer, whereas with a small amount of the system in service, there will be a small capacitance current requiring only a small lagging current or a large number of turns of the ground fault neutralizer in service. Accordingly, in order to control the number of turns in service, there is provided suitable switching or tap changing means, such as a movable contact member 25, which, as shown, is arranged to be actuated by a screw shaft 26 to vary the number of turns of the neutralizer connected between the neutral 8 and ground. Since the relay 20 which effects the closing of the grounding switch 12 must operate in response to the current flowing in the neutralizer, it will be apparent that, if a current transformer is connected in series with the neutral 8 and has a fixed number of primary and secondary turns, the secondary output of the current transformer will vary through such a wide range as to make it unfeasible to design a relay which will positively pick up at the smallest value of current the neutralizer passes and which will not be damaged by the largest value of current the neutralizer passes.

In order to take care of this feature, there may be provided as disclosed in United States Letters Patent 2,247,332, issued June 24, 1941, a current transformer 27 having its primary winding 28 in series with the ground fault neutralizer 11 and its secondary winding 29 in circuit with the winding of the relay 20. The output of the current transformer 27 is so controlled that the current supplied to the relay 20 is maintained within a predetermined range regardless of the amount of the neutralizer in service. To do this independently of the human element, the switching member 25 is so arranged that in changing the number of turns of the ground fault neutralizer in service, it simultaneously changes the number of turns in service of the primary winding 28 of the current transformer 27. Since a suitable operating relay 20 can be economically and practically designed to operate satisfactorily on a current range of at least twice pick-up value, it is not necessary for the switch member 25 to change the tap on the current transformer winding 28 every time that a tap is changed on the neutralizer 11. Thus, as shown, the current transformer primary winding 28 is provided with three taps 30, 31, and 32, each of which covers a predetermined range of taps of the neutralizer 11 so as to insure a predetermined secondary output within the range of pick-up of the relay 20 without destruction thereof by burning or injuring the insulation.

Also, as disclosed in the aforesaid Letters Patent 2,247,332, means are provided for preventing the tap changing operation unless a parallel path to ground is established through the switch 12. Thus, if the screw shaft 26 is driven by an electric motor 33 through suitable gearing 34, then energization of the motor is prevented unless the switch 12 is closed. As illustrated, this is done by providing the switch 12 with an auxiliary "$a$" switch 35 which is arranged in the circuit of the motor 33 and which is closed only when the switch 12 is closed. The circuit of the motor 33 also includes a control switch 36 which may be manually or otherwise suitably operated. Also, as shown, the switch 12 can be opened by energizing its opening winding 37 whose circuit is controlled by the contacts 38 of an instantaneous closing time delay opening relay 39. Time delay dropout may be obtained by a short-circuited winding 40. The circuit of the relay 39 includes a manually or otherwise operated control switch 41 and may also include an "$a$" auxiliary switch 42, movable with the contact 12.

Obviously, if the tap changing device 23 is shifted from one position to another to include different numbers of turns of the neutralizer 11 in the connection between the neutral and ground, varying amounts of current will flow in this connection. It is customary to design the neutralizer 11 so that it has the same time rating for each current tap. This may be done by providing the turns nearer the neutral connection with more cooling fluid than the turns farther away or wire in the turns nearer the neutral may be of higher current-carrying capacity than the turns farther from the neutral or both expedients may be adopted. Ordinarily the voltage to ground across the part of the neutralizer in service is a fixed quantity. If there is no ground fault on the system, this voltage would be zero except for the drop due to the residual current flow in consequence of any electrostatic unbalance of the system. In case of a single conductor to ground fault, the voltage across the neutralizer in service is the line to neutral or star voltage of the system. It is customary to design a neutralizer on this basis, but the possibility of a dangerous overvoltage condition consequent upon series resonance due to the interruption of only one circuit conductor of the system even though a ground fault does not exist. Such overvoltage may subject the neutralizer to excessive heating. Also, an abnormal voltage may occur in the event of an overspeeding waterwheel driven generator during a ground fault. On the other hand, if the voltage across the neutralizer is below the normal line to neutral value, it may be kept in service longer than the time rating for which it was designed.

In order to take care of conditions such as above outlined and protect the neutralizer 11 against overheating, I provide, in accordance with my invention, relay means which is connected to be responsive to the voltage across the portion of the neutralizer in service and whose operating time at normal voltage is the time rating of the neutralizer and is further inversely proportional to the square of the voltage across the portion of the neutralizer in service.

As shown, the neutralizer protective relay means 42 is of the thermal type disclosed in United States Letters Patent 1,501,017, issued July 8, 1924. This relay has a thermal element comprising a thermostatic metal strip 46 and a thermal storage block 47 provided with a heating element 48. The thermostatic strip 46 and the heating element 48 are electrically connected in parallel with a suitably tapped autotransformer 49 which is energized in dependence on the voltage across the secondary winding 43 of the potential transformer 44 in such a manner as truly to reflect the heating of the neutralizer 11. Although for the purpose of illustrating my invention I have shown a specific thermally responsive relay, it will be apparent to those skilled in the art that other types of thermal relays can be used so long as they respond in accordance with the output of the potential transformer 44 to reflect the actual heating of the neutralizer 11.

Although for the purpose of illustrating my invention I have shown a specific thermally responsive relay, it will be apparent to those skilled in the art that other types of thermal relays can be used so long as they respond with the desired time action corresponding to the time rating of the neutralizer and the voltage across the portion of the neutralizer in service. Broadly speaking, any relay whose time of contact controlling action is inversely proportional to the square of the voltage across the portion of the neutralizer in service and whose operating time at normal voltage is the time rating of the neutralizer can be used. Thus, for example, an inverse time element induction type of motor relay whose rotor torque is dependent upon the square of the energizing voltage as obtained from the voltage transformer 44 may be employed. Examples of such relays are well known to the art. Further in accordance with my invention, I so arrange that the response of the thermally responsive relay 42 to the overheating of the neutralizer 11 effectively prevents a flow of current in the neutralizer. This may be accomplished in different ways, each of which may have special adaptability under certain conditions. Thus, for example, I may so arrange that upon the response of the thermal relay 42 to overheating of the neutralizer 11 the switch 12 is closed to by-pass the neutralizer and thus shunt the current causing the overheating. Under certain conditions, it may be advisable to disconnect the neutralizer from the system. In this case, the thermal relay means 42 may be arranged to effect the opening of the circuit breaker 7. In other cases, suitable means, such as a latched closed circuit breaker 59 in circuit between the neutral 8 and the neutralizer 11 may be opened in response to the operation of the thermal relay 42.

Since the tripping action of any switch may, in general, require current in excess of the contact capacity of the thermal relay, I may so arrange that the hot contact 51 of the thermal relay is arranged to control the circuit of an auxiliary relay 52, which is provided with circuit closing seal-in contacts 53 and circuit closing contacts 54 which can be arranged to control the circuit of the trip coil 55 of the circuit breaker 59 or the trip coil 9 of the circuit breaker 7 or the trip coil 17 of the switch 12 or any two or more of these as desired. The auxiliary relay 52 may also have circuit closing contacts 56 arranged to control the circuit of a suitable alarm device 57. A normally closed, manually or otherwise operated switch 58 may be provided to interrupt the seal-in circuit of the relay 52.

Although the winding 45 of the potential transformer 44 is actually connected across both the turns of the neutralizer in service and also the current transformer winding 28, the impedance of the latter is so small relatively to the impedance of the neutralizer as to be negligible. However, the current transformer itself is also included in the protection which is primarily provided for the neutralizer.

Thus, with the arrangement shown, it will be apparent that whenever for any reason the voltage across the neutralizer to ground exceeds the normal amount corresponding to the designed time rating of the neutralizer, the neutralizer will be, in effect, taken out of service by the operation of the thermal relay 42 in a time less than the designed time rating so as to avoid dangerous overheating. On the other hand, if for any reason the voltage across the neutralizer to ground is below normal, the heat response of the thermal relay 42 will involve a longer time so that the neutralizer will not be taken out of service until this increment of cool time has been used up in addition to the normal time rating of the neutralizer. In other words, the advantage of any cool condition of the neutralizer is made available without the hazard of overheating.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States, is:

1. In an alternating current electric system, a variable impedance device normally subject to the same voltage for each value of impedance and having substantially the same time rating for each impedance value, and means for protecting said impedance device against overheating comprising inverse time element relay means connected to respond to the voltage across the device, and means controlled by said relay means for effectively preventing a flow of current in said impedance means.

2. An alternating current electric system comprising a variable inductance device normally subject to the same voltage for each value of inductance and having substantially the same time rating for each inductance value, and means for protecting said inductance device against overheating comprising transforming means subjected to the same voltage as said inductance device, inverse time element relay means connected to be energized from said transforming means, and means controlled by said relay means for effectively preventing a flow of current in said inductance device.

3. In an alternating current electric system having a neutral, a variable impedance device connected between said neutral and ground and having substantially the same time rating for each impedance value, and means for protecting said impedance device against overheating comprising inverse time element relay means connected to respond to the voltage across said impedance device to ground, and means controlled by said relay means for effectively preventing a flow of current in said impedance device.

4. In an alternating current system having a neutral and of the type wherein a fault to ground on one phase conductor of the system substantially increases the capacitance current to ground of the ungrounded phase conductors of the system, a zero-sequence inductive connection to ground through said neutral proportioned to provide on the occurrence of a ground on a phase conductor of the system a lagging current for effectively suppressing the capacitance current to ground at the grounded point and comprising a tapped inductive reactance connected between said neutral and ground, and means for protecting said inductive reactance device against overheating regardless of the amount of the device connected between the neutral and ground comprising a switch for connecting the high voltage side of said reactance device to ground, and thermally responsive relay means for effecting a closing operation of said switch comprising means for energizing said relay means substantially in accordance with the voltage to ground across the inductive reactance device including a potential transformer connected between the high voltage side of the reactance device and ground.

5. In an alternating current system having a neutral and of the type wherein a fault to ground on one phase conductor of the system substantially increases the capacitance current to ground of the ungrounded phase conductors of the system, a zero-sequence inductive connection to ground through said neutral proportioned to provide on the occurrence of a ground on a phase conductor of the system a lagging current for effectively suppressing the capacitance current to ground at the grounded point and comprising a tapped inductive reactance connected between said neutral and ground, and means for protecting said inductive reactance device against overheating regardless of the amount of the device connected between the neutral and ground comprising thermally responsive relay means, means for energizing said relay means substantially in accordance with the voltage to ground across said inductive reactance device comprising a potential transformer connected between the high voltage side of the reactance device and ground, and means controlled by said thermally responsive means for effectively preventing a flow of current to ground through said inductive reactance device.

6. In an alternating current electric system having a neutral and of the type wherein a fault to ground on a phase conductor of the system substantially increases the capacitance current to ground of the ungrounded phase conductors of the system, an inductive connection to ground from said neutral comprising an inductive reactance device, means for so varying the inductance of said device to correspond to the capacitance to ground of the system in service that the zero-sequence inductance of the connection on the occurrence of a ground on a phase conductor of the system provides a lagging current for effectively suppressing the capacitance current to ground at the grounded point, means for protecting said inductive reactance device against overheating regardless of the amount of the device in service comprising thermally responsive relay means, means for energizing said relay means substantially in accordance with the voltage to ground across the portion of said inductive reactance device in service comprising a potential transformer connected between the high voltage side of the reactance device and ground, and means controlled by said thermally responsive means for effectively preventing a flow of current to ground through said inductive reactance device when the heating thereof exceeds a predetermined amount.

7. In an alternating current electric system having a neutral and of the type wherein a fault to ground on a phase conductor of the system substantially increases the capacitance current to ground of the ungrounded phase conductors of the system, an inductive connection to ground from said neutral comprising an inductive reactance device, means for so varying the inductance of said device to correspond to the capacitance to ground of the system in service that the zero-sequence inductance of the connection on the occurrence of a ground on a phase conductor of the system provides a lagging current for effectively suppressing the capacitance current to ground at the grounded point, means for connecting the high voltage side of said inductive reactance substantially directly to ground operative in dependence on the current flowing in said inductive connection a predetermined time after the occurrence of a ground fault which is not suppressed by the lagging current flowing in the connection, means for protecting said inductive reactance device against overheating regardless of the amount of the device in service comprising thermally responsive relay means, means for energizing said relay means substantially in accordance with the voltage to ground across the portion of said inductive reactance device in service comprising a potential transformer connected between the high voltage side of the reactance device and ground, and means controlled by said thermally responsive means for effecting the operation of said connecting means.

8. In an alternating current system having a neutral and of the type wherein a fault to ground on one phase conductor of the system substantially increases the capacitance current to ground of the ungrounded phase conductors of the system, a zero-sequence inductive connection to ground through said neutral proportioned to provide on the occurrence of a ground on a phase conductor of the system a lagging current for effectively suppressing the capacitance current to ground at the grounded point and comprising a tapped inductive reactance connected between said neutral and ground so constructed and arranged that the portion of the device between the neutral and each tap has the same time rating for the normal line to neutral voltage of the system, and means for protecting said inductive reactance device against overheating regardless of the amount of the device connected between the neutral and ground comprising relay means connected to respond to the voltage across the portion of the device in service and having a time action for the normal line to neutral voltage of the system substantially equal to the time rating of the device and operating in a time inversely proportional to the magnitude of the voltage across the portion of the device in service, and means controlled by said relay means for effectively preventing a flow of current to ground through said inductive reactance device.

PHILIP H. LIGHT.